Nov. 23, 1954          F. W. MOFFETT, JR                2,694,988
       METHOD OF REDUCING A SOLID BLOCK OF NORMALLY LIQUID
         EDIBLE MATERIAL FROM A HARD TO A SPONGY MASS
                    Filed April 6, 1951
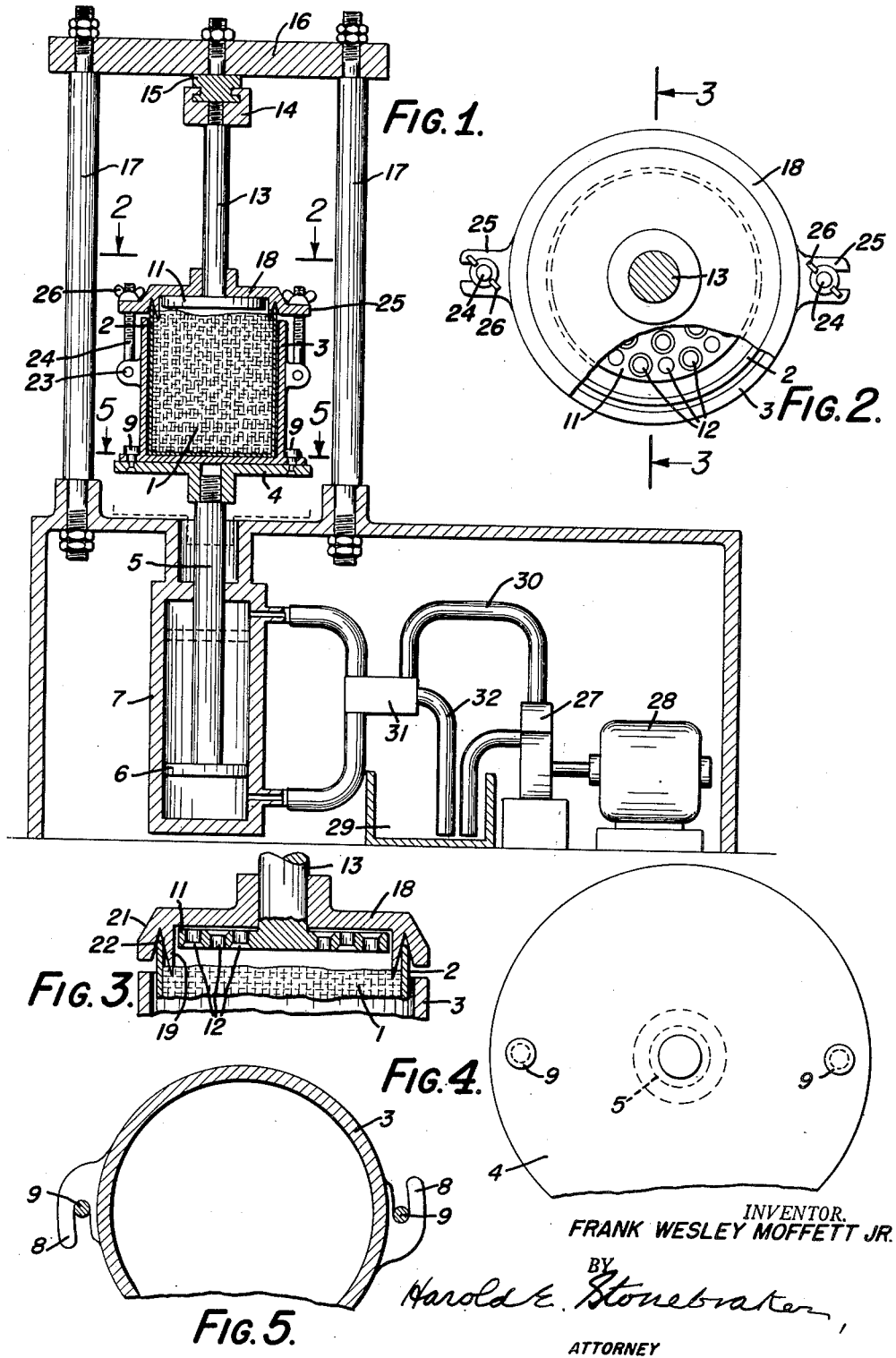
INVENTOR.
FRANK WESLEY MOFFETT JR.
BY Harold E. Stonebraker
ATTORNEY

United States Patent Office 2,694,988
Patented Nov. 23, 1954

2,694,988

METHOD OF REDUCING A SOLID BLOCK OF NORMALLY LIQUID EDIBLE MATERIAL FROM A HARD TO A SPONGY MASS

Frank Wesley Moffett, Jr., Chili, N. Y.

Application April 6, 1951, Serial No. 219,698

5 Claims. (Cl. 107—54)

This invention relates to a method of making a soft plastic frozen confection, with particular reference to the type of product known commercially as "soft ice cream," and has for its purpose to afford a method of producing soft ice cream or similar frozen confection at a substantial saving in cost over present methods and resulting in a more pleasing and palatable product, also enabling a small retailer to serve soft frozen confections of any flavor and character, which can be prepared successfully, economically, and quickly, and require only a small fraction of the investment and operating expense necessary for machinery heretofore employed for dispensing soft ice cream.

The expression "soft ice cream" where used throughout this application refers to the type of frozen confection that has become widely popular in recent years and consists of ice cream or other frozen product in a soft plastic state, such as characterizes ice cream immediately after it is frozen in a conventional freezer and before hardening, or produced in a machine designed for continuous production of soft ice cream, and in either instance such soft ice cream must be consumed within approximately one and one-half hours after its manufacture, as otherwise it melts or else recrystallizes and loses its pleasing taste and character.

During the conventional ice cream freezing process, the water content in the mix is agitated and rapidly cooled, resulting in formation of ice crystals which are very small and fine due to the continuous agitation of the mix during freezing which permits the ice crystals to move freely in relation to each other. Such small crystals are distributed uniformly through the remaining content of the mix which is more viscous, and consequently the ice cream acquires a plastic character with the viscous non-water ingredients predominating over the fine ice crystals. In this form, the ice crystals are not noticeable to the taste and the ice cream is extremely pleasing and palatable, being preferred by most people to the taste acquired when subjected to lower temperatures for hardening.

Ice cream in such soft plastic state as acquired immediately after freezing has a temperature of approximately from 16° F. to 18° F. depending on its sugar content, and if kept at this temperature has a tendency to melt or soften and the water crystals to recrsytallize into larger crystals which make the product less pleasing, less desirable, and not so readily salable. For ice cream to be tasty, it is essential that the ice crystals be formed by rapid freezing and during constant agitation, and if crystallization takes place slowly and without agitation, the product is not satisfactory. Consequently after ice cream is frozen by large volume manufacture to a plastic state, it is quickly hardened at temperatures of −20° F. or lower in order to capture the fine water crystals in their original state and to prevent their melting and recrystallizing into larger crystals.

A large proportion of manufactured ice cream is distributed to the public in packages from hardening cabinets which maintain the ice cream at such low temperatures as to maintain the ice crystals in their original fine state and the entire mass in a very hard, solid state, which it retains until ready for use, when it is subjected to room temperature or higher that softens it and reduces it to a condition for consumption.

In the hard solid state, viscosity of the mass is reduced to zero, and after this state is once reached, it is impossible to restore the frozen mass to its original plastic state by raising its temperature. When elevated to 18° F. and higher, the ice cream finally reaches a liquid state without becoming plastic at any stage, and it does not at any point reacquire the plastic condition and taste it possessed immediately after coming from the original freezer.

It is impractical to serve soft ice cream by freezing it in conventional freezers because, as indicated above, it cannot be held at the desirable temperature of approximately 18° F. for any considerable length of time and it is economically impracticable to keep on hand a sufficient supply of soft ice cream in various flavors to take care of the required public demand.

Soft ice cream can only be dispensed successfully by producing it at the place where consumed, and consequently there have been developed soft ice cream machines which produce and have available a continuous supply of soft ice cream. There are two general types of such machines in use, one of which makes and holds soft ice cream that is agitated each time a portion is discharged, the machine being started and stopped as often as desired to fill an ice cream cone, a cup, or the like, but this type of machine is open to various objections. Ice cream from such machines is not uniform over a period of time and has an overrun of as high as 100%, resulting in an inferior product that generally has more crystallization and is not so tasty and pleasing, due to the repeated agitation of the ice cream in the machine.

With the other type of soft ice cream machine that is in more general use, the mix is fed into the machine continuously while the machine is operating and the mix at once converted into soft ice cream which is drawn from the machine and which can be held in a container and served as required, but this type of apparatus is open to certain objections. The initial investment in the apparatus is large and the cost of operating such a machine substantial since it requires the services of a semi-skilled operator and cannot be left to an average clerk. The average installation requires two such machines and can produce approximately only twenty-five gallons of ice cream per hour in two flavors and the ice cream must be consumed within a short time after its production, or the product becomes too soft and liquid or recrystallizes with large ice crystals and is not as refreshing as a somewhat colder ice cream. Cones made with such soft ice cream cannot be dipped into chocolate or other flavored coatings owing to the soft character of the ice cream which makes it difficult to handle.

An additional objection to this type of machine is that only one flavor of ice cream can be produced at a time with each machine so that several units are required for several flavors of ice cream if they are to be simultaneously available, and it is not possible to produce with such a machine soft ice cream containing nuts or fruit particles which are highly desirable in certain ice cream mixes, since the mechanical limitations of the machine prevent the use of such ice cream ingredients.

The sale and public acceptance of soft ice cream has increased in much greater proportion than other ice cream in recent years and to a point where the sale of hard packaged ice cream has been seriously affected by the use of soft ice cream machines by retailers, although these are limited in use to seasons of the year and locations where the demand for soft ice cream is substantial and continuous.

This invention is designed to afford a method that produces soft plastic ice cream or other frozen confection that can be somewhat colder and more viscous, refreshing, and pleasing than conventional soft ice cream, while at the same time having all the desirable properties of soft ice cream, due to the fact that the ice crystals have not been recrystallized but are in their original fine state, and which produces soft ice cream from a solid block of hardened ice cream, converting the same from a temperature of from 5° F. to 14° F. to a temperature of from 10° F. to 18° F. or thereabouts and accomplishes this quickly and economically.

Soft ice cream produced according to my invention can be somewhat colder than produced on conventional soft ice cream machines because the procedure starts with hardened ice cream at a low temperature and converts the solid block into a plastic state by mechanical action, sufficiently to attain the desired degree of plasticity in the product while it can retain a lower temperature than otherwise possible, thus avoiding melting the ice cream to a point near where it becomes liquid or runny.

My invention enables taking ice cream or other frozen confection of any flavor or content packaged in a cardboard or other container, and converting it into a soft plastic edible state, or if desirable into a semi-liquid or liquid state, while in the original container.

The invention in general consists in confining a packaged block of solid hardened frozen confection such as ice cream, and while thus confined subjecting the frozen mass to mechanical action as by means of a perforate plunger that is moved back and forth through the hard block under considerable pressure, acting first to crush or break up the hard solid body into separate portions and thereafter, as it is passed back and forth through the ice cream, to plasticize the mass by intermixing the separate portions under mechanical pressure until the entire mass has acquired a soft, plastic state of uniform consistency having a temperature of approximately 10° F. to 18° F.

Starting with hardened ice cream having an overrun of approximately 90%, my process produces a plastic ice cream having an overrun of approximately 40% to 45% which gives the most uniform, smooth product and is most desirable. The resulting product is sufficiently cold and viscous so that dips of such ice cream can be coated with chocolate or other flavored coatings without loss of the ice cream into the coating material.

With such procedure, an oparator with one low cost machine and an unskilled attendant can quickly convert hard frozen ice cream in any size package into soft, plastic ice cream and thus produce any number of different flavors or types of soft ice cream as fast as the trade demands, with a tremendous saving to the retailer in cost of equipment and operation, while furnishing a soft, plastic ice cream product that is more pleasing than soft ice cream as now produced on conventional soft ice cream machines.

With this invention, a retailer can readily produce any flavor of ice cream by adding any selected flavoring to an unflavored hardened ice cream before or during the plasticizing operation, or by adding nuts, fruits, candied or other products to the ice cream during the plasticizing operation. Also ice cream and sherbet, or other combinations of frozen confections can be mixed in more or less degree during the plasticizing operation, to obtain any desired combination or flavors. The invention also enables obtaining soft ice cream with flavors that cannot be secured in any other practical way, as for instance by adding unfrozen bananas or other unfrozen fruit in their natural state to the ice cream during the plasticizing operation, so that in the final product, the banana or other fruit exists in an unfrozen and uncrystallized state, giving a flavor and taste distinctly different from frozen fruit, and not possible with any other practical methods.

The invention is also adapted to the serving of milk shakes and sundaes which are now produced at factories and hardened in containers, and such frozen products can be converted into any desired degree of plasticity or liquidity by the present method quickly and economically.

To these and other ends, the invention consists in the method that will appear clearly from the following description when read in conjunction with the accompanying drawings, the novel features being pointed out in the claims following the specification.

In the drawings:

Fig. 1 is a generally diagrammatic side view of one form of apparatus by which the invention may be practiced;

Fig. 2 is a sectional view on the line 2—2 of Fig. 1, partially broken away;

Fig. 3 is an enlarged detail sectional view on line 3—3 of Fig. 2;

Fig. 4 is a detail view in elevation showing the top of the reciprocatory support, and Fig. 5 is a sectional view on line 5—5 of Fig. 1, showing the receptacle within which the confection and container are positioned.

The method forming the subject matter of the invention may be performed with different forms of apparatus, and in the machine herein disclosed, which is exemplary of one practical embodiment, there is provided means for effecting relative movement between a body of hard frozen ice cream or other confection packaged in a cardboard or other container and a plunger having perforations therein, or otherwise constructed to permit its travel through the mass of frozen confection, such relative movement being effected by any suitable hydraulic pressure apparatus or other suitable means, and it will be understood that satisfactory results can be had by holding stationary either the frozen confection body or the plunger and moving the other element relatively thereto, also by relatively moving the plunger or other intermixing instrumentality in a direction other than rectilinearly.

In the structure shown, the frozen confection or hardened ice cream body is indicated at 1, being located within a cylindrical container 2. Ice cream packed for shipment and future consumption is frequently stored in Dixie cups, pint, quart, gallon, two and one-half gallon, and five gallon containers and maintained at temperatures of from 0° F. to —20° F. for hardening purposes so as to maintain the ice crystals in the very fine state acquired in the initial freezing process. If the ice cream is hardened to a temperature of 0° F. or lower shortly after freezing, there is no recrystallization and the ice crystals remain in the fine state acquired immediately after the initial freezing operation when the ice cream is soft and plastic.

The container 2 with the solid ice cream mass therein is positioned and confined within a receptacle or ring 3 that limits expansion of the container 2, and the receptacle 3 is of somewhat greater diameter than the container in order to permit slight expansion of the ice cream and container when downward pressure of the plunger is effected, as will be described presently. The receptacle 3 is detachably positionable on a supporting plate 4 carried by a piston rod 5 connected to a piston 6 which is operable within cylinder 7 by hydraulic pressure means, and to effect interlocking between the supporting plate 4 and the receptacle 3, the latter may be provided with interlocking lugs 8 that engage pins or projections 9 when the receptacle is rotated partially to lock the receptacle on the supporting plate 4.

11 designates a plunger having a multiplicity of perforations or openings 12 of from ¼" in diameter to larger diameters, or of other shapes such as slots, squared openings, or the like extending therethrough and distributed uniformly over its surface, the frozen confection being forced through said openings alternately in opposite directions as the plunger and frozen body are reciprocated relatively to each other. The plunger 12 is mounted on a rod 13 that is fixedly supported in any suitable fashion as by means of a head 14 slidably secured to a block 15 suitably mounted on the overhead portion 16 of a supporting frame 17.

18 designates a cover adapted to overlie the open end of the container 2 and to limit upward movement of the ice cream body, confining it within the container during the crushing and intermixing operations and preventing expansion of the ice cream mass beyond the limits of cover 18 and the container.

The cover 18 includes a downwardly projecting interior flange 19 adapted to engage within the container 2 while 21 is an exterior flange spaced from and surrounding the interior flange 19 and positionable around the exterior of the container, the upper edge of which latter is engaged against the inclined wall 22 to effect substantial sealing of the container when the cover is tightened thereon. To effect such tightening, the receptacle 3 is provided on opposite sides with ears 23 to which are pivoted bolts 24 engageable with lugs 25 on the cover 18 and adapted when the nuts 26 are tightened to clamp the cover 18 against the upper edge of the container 2 and to seal the latter in such fashion as to prevent the frozen body being forced from between the cover and the container.

The piston 6 is controlled from a hydraulic pump 27 operated by motor 28 and acting to force oil from a reservoir 29 through pipe 30 to a controlling valve 31 and to opposite ends of the cylinder 7, 32 being a return pipe from valve 31 to the reservoir 29. It will be understood that the hydraulic mechanism forms no part of the invention and any suitable hydraulic mechanism and control valve may be employed to effect the required opposite movements of piston 6 in cylinder 7 and the resulting up-and-down movements of receptacle 3 and the frozen body 1 in relation to the perforate plunger 11.

In operation, a container 2 with ice cream or other confection packed therein and which may have a temperature of from 5° F. to 14° F. or lower is placed within the receptacle 3 and the latter fastened on supporting plate 4, following which the supporting plate and receptacle are moved upwardly until the hard frozen body is in contact with plunger 11 immediately under cover 18. The fastening bolts 24 are then moved to engage lugs 25 on the cover and the nuts 26 tightened to hold the cover 18 in engagement with the frozen mass and the container 2, it being understood that cover 18 is provided with a central opening to permit its movement endwise of the stationary supporting rod 13 on which plunger 11 is fixedly mounted.

With the parts in this position, the hydraulic pressure mechanism is operated to effect upward movement of the frozen body 1, its container 2, and the receptacle 3, thus forcing the hard frozen mass endwise of plunger 11 and through the openings 12 therein, crushing the frozen mass into a multiplicity of separate portions. The frozen mass is thus crushed or broken during the initial pass of the plunger through the body of ice cream, such action being effected by a pressure of approximately from forty to sixty pounds per square inch more or less depending upon the hardness of the frozen body, and during this operation, any lateral expansion of the frozen body and its container is permitted by the elasticity of the container and the space provided between the container 2 and the surrounding receptacle 3.

It will be understood that the cover 18, plunger 11, receptacle 3, and supporting plate 4 are changeable and may be of any selected size, depending upon the dimensions of the ice cream container.

Satisfactory results have been obtained by crushing ice cream under mechanical pressure as described above when the ice cream is at a temperature of from 5° F. to 14° F., and where it has been stored at a temperature of from −20° F. to −30° F. or lower, it is preferably first raised to a temperature of from 5° F. to 14° F. in a conventional storage cabinet such as usually found in ice cream dispensaries, and when taken from such cabinet is at a suitable temperature to be placed in the machine and converted into a plastic state having a temperature of from 10° F. to 18° F.

Another method of elevating the temperature of the frozen mass from −20° F. to −30° F. to form 5° F. to 14° F. consists in placing the frozen body in a radar range for a few seconds which quickly brings the frozen body to a temperature where it can be successfully and readily crushed and plasticized.

The initial pass of the plunger through the ice cream body results in crushing it into a multiplicity of separate portions, after which the hydraulic mechanism is continuously operated to effect successive upward and downward movements of the receptacle and frozen body past the plunger 11, causing the plunger to be forced through the frozen mass repeatedly in opposite directions and to effect a thorough intermixing and plasticizing of the separate frozen portions produced by the initial crushing operation. As the back-and-forth movements of the frozen mass are repeated, the separate portions of ice cream become thoroughly intermingled, with the fine ice crystals uniformly distributed through the viscous non-water content of the mix, and after about six to eight passes more or less, the ice cream is in a uniformly smooth, plastic state having a temperature of from approximately 10° F. to 18° F.

Since ice cream thus treated can be hardened to an extremely low temperature immediately after freezing and maintained in such state until ready to be converted into the plastic state, the ice crystals are retained in their original very fine state during conversion of the frozen body by mechanical pressure into the plastic state. Consequently the final product has a plasticity and smoothness that is equal or superior to that of fresh frozen ice cream before being hardened, or to any ice cream made in a soft ice cream machine, with the added advantage that the product can be somewhat colder and therefore more refreshing and palatable.

By former processes, the desired degree of softness and plasticity could be had only with ice cream at a somewhat higher temperature whereas under the present invention, by changing the ice cream to a soft state from a lower temperature by mechanical pressure rather than by freezing the ingredients and thus lowering the temperature, a satisfactory degree of plasticity and softness can be had to impart maximum palatability and pleasing taste while at the same time retaining a somewhat lower temperature than was heretofore possible.

With this procedure, ice cream or frozen confections of any kind, including sundaes, milk shakes, Dixie cups, sherbets, and ices in any sized containers, can be converted into a plastic, semi-liquid, or liquid state in the case of milk shakes at temperatures of from 10° F. to 50° F., while packaged in their original container, and where desired for dipping or for filling cones, a two and one-half gallon container can quickly be positioned in the machine and converted into the desired plastic state in an operation that occupies not more than two minutes.

The process also enables an operator to convert ice cream of any flavor or of any consistency into a plastic state suitable for immediate consumption, including ice creams containing nuts, fruits, and candied particles which cannot be handled in conventional soft ice cream machines and cannot be served as soft ice cream under present procedures except from a conventional ice cream freezer, in which case the soft ice cream must be dipped and served within approximately an hour or so after freezing, because if held for a longer period it melts or recrystallizes.

With the present invention, there is a tremendous economic saving as compared with using conventional soft ice cream machines since a machine for carrying out the process costs about one-fifth that of a conventional soft ice cream machine or less. The cost of operation is also considerably less as it requires only an unskilled operator and only one machine in each dispensary whereas with conventional soft ice cream machines, the operator must be more skilled and higher paid and at least two machines are required for maintaining a suitable supply of popular flavors of ice cream.

With conventional soft ice cream machines, in most instances two machines are used and can produce approximately twenty-five gallons of ice cream per hour in only two flavors, whereas with the equipment under the present method, an unskilled operator can produce seventy-five gallons of soft ice cream per hour in thirty or more different flavors and with only one machine.

Under existing conditions, since soft ice cream must be sold shortly after its production and can only be produced successfully in relatively large quantities, it is only sold in locations and at seasons when there is a continuous and heavy demand, whereas with the present invention enabling the production of any quantity of soft, plastic ice cream in its original container with only a small cost, soft ice cream or any other frozen confection can be merchandised at all seasons of the year regardless of demand and there is no economic limit to the amount or kind of soft, plastic ice cream that can be supplied at any time. Another important advantage is that soft ice cream made by my process can be kept at a lower temperature than conventional soft ice cream, and if not used in a short time, can be again plasticized without lessening its pleasing taste and palatability, which result cannot be attained with conventional soft ice cream.

While the invention has been described with reference to certain steps and apparatus, it is not confined to any of the details herein disclosed and this application is intended to cover such changes or departures as may come within the intent of the improvements and the scope of the following claims.

I claim:

1. The method of reducing a solid frozen block of normally liquid, edible material from a hard to a spongy mass, comprising the steps of confining a solid block of said material and crushing the same into a spongy mass while confined, by moving mechanical applications of pressure against a selected portion of the sectional area of the block, first in one direction and then in the opposite direction, and resisting each application of pressure by an opposing stationary force applied over an oppositely located sectional area in spaced portions, the total area over which the opposing stationary force is applied being less than that of the moving force application area.

2. The method of reducing a solid frozen block of normally liquid edible material from a hard to a spongy mass, comprising the steps of confining a solid block of said material in a pressure-resisting enclosure comparable in shape and in volume to that of said block, repeatedly, while so confined, applying moving mechanical pressure uniformly throughout a selected sectional area of said block, first in one direction and then in the opposite direction and opposing each application of the moving force by a stationary force uniformly applied over separated portions of a sectional area of said block comparable in area to and oppositely located to that of the first mentioned sectional area, the above operation being carried on until a desired spongy mass is obtained.

3. The method of reducing a solid frozen block of normally liquid, edible material from a hard to a spongy mass, comprising the steps of confining a solid block of said material in a pressure-resisting enclosure comparable in shape and in volume to that of said block, repeatedly, while so confined, applying moving mechanical pressure at approximately 40 to 60 pounds per square inch uniformly throughout a selected sectional area of said block, first in one direction and then in the opposite direction and opposing each application of the moving force by a stationary force uniformly applied over separated portions of a sectional area of said block comparable in area to and oppositely located to that of the first mentioned sectional area, the above operation being carried on until a desired spongy mass is obtained.

4. The method of reducing a solid frozen block of normally liquid, edible material from a hard to a spongy mass, comprising the steps of confining a solid block of said material having a temperature of approximately 5° F. to 14° F. in a pressure-resisting enclosure comparable in shape and in volume to that of said block, repeatedly, while so confined, applying moving mechanical pressure at approximately 40 to 60 pounds per square inch uniformly throughout a selected sectional area of said block, first in one direction and then in the opposite direction and opposing each application of the moving force by a stationary force uniformly applied over separated portions of a sectional area of said block comparable in area to and oppositely located to that of the first mentioned sectional area, the above operation being carried on until a desired spongy mass is obtained.

5. The method of reducing a solid frozen block of normally liquid, edible material from a hard to a spongy mass, comprising the steps of confining a solid block of said material having a temperature of approximately 5° F. to 14° F. in a pressure-resisting enclosure comparable in shape and in volume to that of said block, repeatedly, while so confined, applying moving mechanical pressure at approximately 40 to 60 pounds per square inch uniformly throughout a selected sectional area of said block, first in one direction and then in the opposite direction and opposing each application of the moving force by a stationary force uniformly applied over separated portions of a sectional area of said block comparable in area to and oppositely located to that of the first mentioned sectional area, the above operation being carried on until a desired spongy mass having an approximate temperature of 10° F. to 18° F. is obtained.

References Cited in the file of this patent

UNITED STATES PATENTS

| Number | Name | Date |
|---|---|---|
| 500,990 | Bunker et al. | July 4, 1893 |
| 541,837 | Critcher et al. | July 2, 1895 |
| 1,348,951 | Knemeyer | Aug. 10, 1920 |
| 2,109,102 | Cocks | Feb. 22, 1938 |
| 2,266,093 | Stover | Dec. 13, 1941 |
| 2,420,203 | Sherbondy | May 6, 1947 |
| 2,516,895 | Luterick | Aug. 1, 1950 |